United States Patent
Furukawa et al.

(10) Patent No.: US 6,945,598 B2
(45) Date of Patent: Sep. 20, 2005

(54) CABLE WIRING CONSTRUCTION

(75) Inventors: Osamu Furukawa, Chigasaki (JP); Yuuichi Ayuha, Chigasaki (JP); Toshiharu Endou, Chigasaki (JP)

(73) Assignee: Autech Japan, Inc., Kanagawa (JP)

( * ) Notice: Subject to any disclaimer, the term of this patent is extended or adjusted under 35 U.S.C. 154(b) by 0 days.

(21) Appl. No.: 10/720,320

(22) Filed: Nov. 24, 2003

(65) Prior Publication Data

US 2004/0189063 A1 Sep. 30, 2004

(30) Foreign Application Priority Data

Mar. 24, 2003 (JP) ........................................ 2003-079664

(51) Int. Cl.⁷ .............................................. A47C 7/62
(52) U.S. Cl. .................................................. 297/217.3
(58) Field of Search .......................... 297/217.3, 217.6, 297/217.4; 5/616

(56) References Cited

U.S. PATENT DOCUMENTS

| | | | | |
|---|---|---|---|---|
| 1,704,415 A | * | 3/1929 | Wenegrat | 297/217.6 |
| 4,310,307 A | * | 1/1982 | Bellisario | 433/33 |
| 5,610,674 A | * | 3/1997 | Martin | 352/85 |
| 5,624,156 A | * | 4/1997 | Leal et al. | 297/217.4 |
| 5,636,852 A | * | 6/1997 | Sistrunk et al. | 280/30 |
| 5,713,633 A | * | 2/1998 | Lu | 297/364 |
| 5,713,832 A | * | 2/1998 | Jain | 601/49 |
| 6,028,520 A | * | 2/2000 | Maehre | 340/573.1 |
| 6,135,551 A | * | 10/2000 | Linder | 297/217.4 |
| 6,158,808 A | * | 12/2000 | Margolis et al. | 297/330 |
| 6,206,475 B1 | * | 3/2001 | Tai | 297/452.41 |
| 6,682,494 B1 | * | 1/2004 | Sleichter et al. | 601/57 |
| 2002/0165583 A1 | * | 11/2002 | Tepper et al. | 607/2 |

FOREIGN PATENT DOCUMENTS

WO      WO 9400206 A1 * 1/1994 ............ A63F/7/02

* cited by examiner

Primary Examiner—Peter M. Cuomo
Assistant Examiner—Stephen D'Adamo
(74) Attorney, Agent, or Firm—Jordan and Hamburg LLP

(57) ABSTRACT

There is provided a cable wiring construction capable of preventing troubles caused by breaking of cable. A curl cord 15 is extended from a unit body 11 under a seat 1, and a controller 16 is provided at a tip end of the curl cord 15. A backboard is fixed to a back surface 22 of a seat back 21 with clips, and a locking member is provided between the backboard and the seat back 21. An upper loop portion and a lower loop portion at both ends of the locking member are fixed to the seat back 21 together with the backboard by clips. A locking portion 41 tied to the curl cord 15 is provided in an intermediate portion of both loop portions, and the proximal ends of the locking portion 41 are positioned in a state of being held between the seat back 21 and the backboard, so that the locking portion 41 for the curl cord 15 is provided on the seat back 21. A height position of the curl cord 15 in the locking portion 41 is set so as to be higher than a seat cushion 51.

4 Claims, 4 Drawing Sheets

CABLE WIRING CONSTRUCTION

BACKGROUND OF THE INVENTION

1. Field of the Invention

The present invention relates to a cable wiring construction for a cable connected to a controller.

2. Description of the Related Art

Conventionally, a control unit for sliding or turning a seat 101 has been provided at a lower part of a vehicular seat as shown in FIG. 4. From this control unit, a curl cord 102, which is a cable, extends, and at a tip end of the curl cord 102, a controller 103 for operating the control unit is provided.

The controller 103 is detachably held by a holder 112 at the side of a seat cushion 111, and the seat 101 can be slid or turned by manual operation of the controller 103 performed by a seater.

In such a cable wiring construction, however, the curl cord 102 is set so as to be longish because a margin is provided, so that the curl cord 102 may be caught by a slide mechanism or a rotation mechanism during the operation of the seat 101.

In this case, the cord may be broken, and hence there is a fear that the operation using the controller 103 is made disable.

SUMMARY OF THE INVENTION

The present invention has been achieved in view of the above conventional problems, and accordingly an object thereof is to provide a cable wiring construction capable of preventing troubles caused by breaking of cable.

To solve the above problem, the present invention provides a cable wiring construction for a cable provided between a controller operated by a seater on a seat and a unit body, wherein a locking portion for locking an intermediate portion of the cable is provided on a seat back of the seat, and a height position of the cable in the locking portion is set so as to be higher than a seat cushion of the seat.

That is to say, the intermediate portion of the cable extending from the unit body to the controller is locked to the locking portion provided on the seat back, and the height position of the cable in the locking portion is set so as to be higher than the seat cushion.

Therefore, the height position of the cable located between the controller operated by the seater on the seat cushion and the locking portion is kept higher than the seat cushion.

Also, in the cable wiring construction, a string-form locking member is provided between the seat back and a backboard fixed to the seat back with a plurality of clips, the locking member being provided with at least a pair of locked portions that are locked by clips at different places, and the locking portion which is positioned by being held by the seat back and the backboard and exits in an elongated form on an outer periphery of the backboard is provided between both the locked portions.

That is to say, the locking member provided between the seat back and the backboard is positioned in a state in which a pair of locked portions are locked by clips at different places and a portion between both the locked portions is held between the seat back and the backboard.

The locking member is provided with the locking portion in a portion exiting in an elongated form on the outer periphery of the back board, and the cable is fixed to the seat back by the locking portion.

DETAILED DESCRIPTION OF THE PREFERRED EMBODIMENTS

Figure 1:
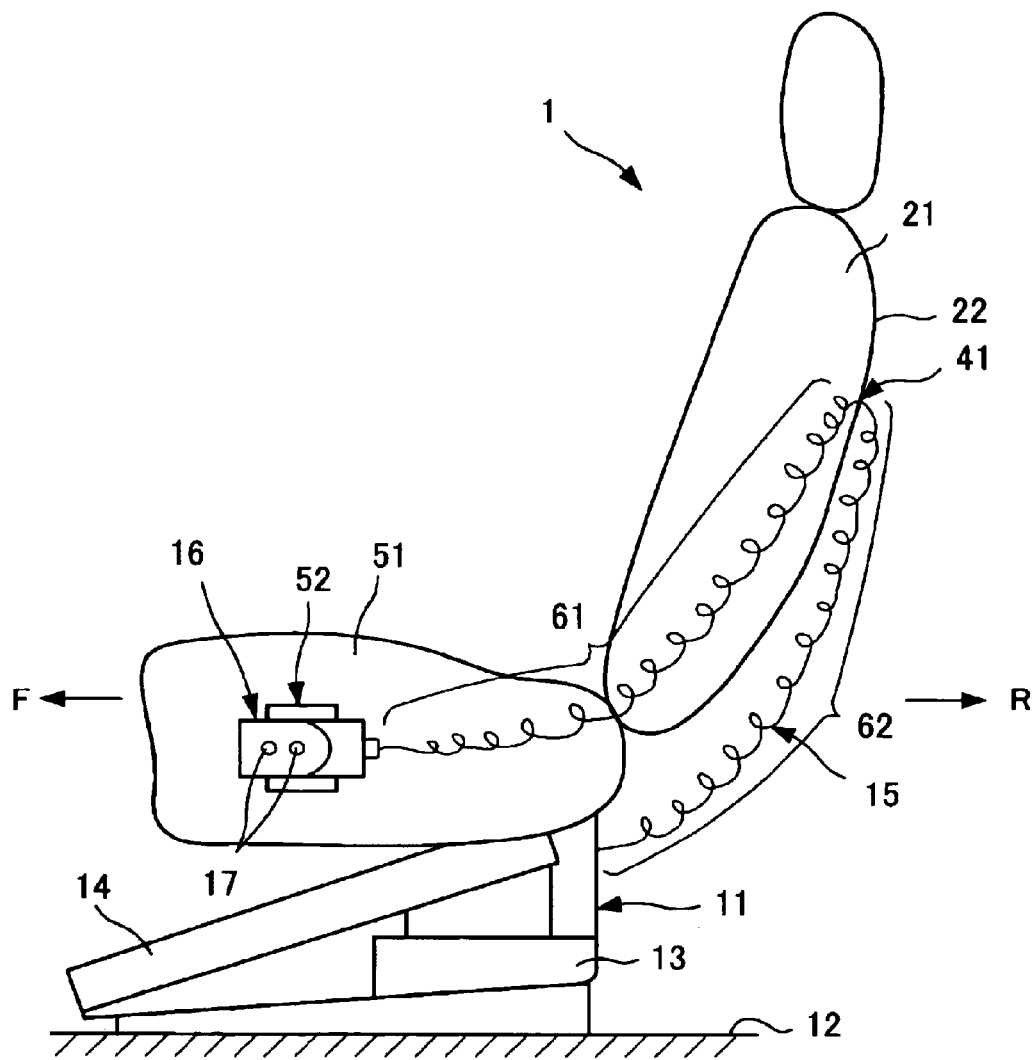
FIG. 1 is a side view showing one embodiment of the present invention.

One embodiment of the present invention will now be described with reference to the accompanying drawings. FIG. 1 shows a cable wiring construction in accordance with the embodiment, showing an example in which the cable wiring construction is applied to a seat 1 of a driver seat in a vehicle.

The seat 1 is fixed to a floor 12 via a unit body 11, and the unit body 11 is provided with a rotation mechanism 13 for turning the seat 1 by electrical power and a slide mechanism 14 for sliding the seat 1 forward and backward by electrical power. From the back surface on the vehicle rear R side of the unit body 11, a curl cord 15, which is a cable, extends, and at a tip end of the curl cord 15, a controller 16 is provided. This allows a seater on the seat 1 to take the controller 16 in his/her hand and operate buttons 17, . . . on the controller 16, and thereby the seat 1 can be turned or slid.

Figure 2:
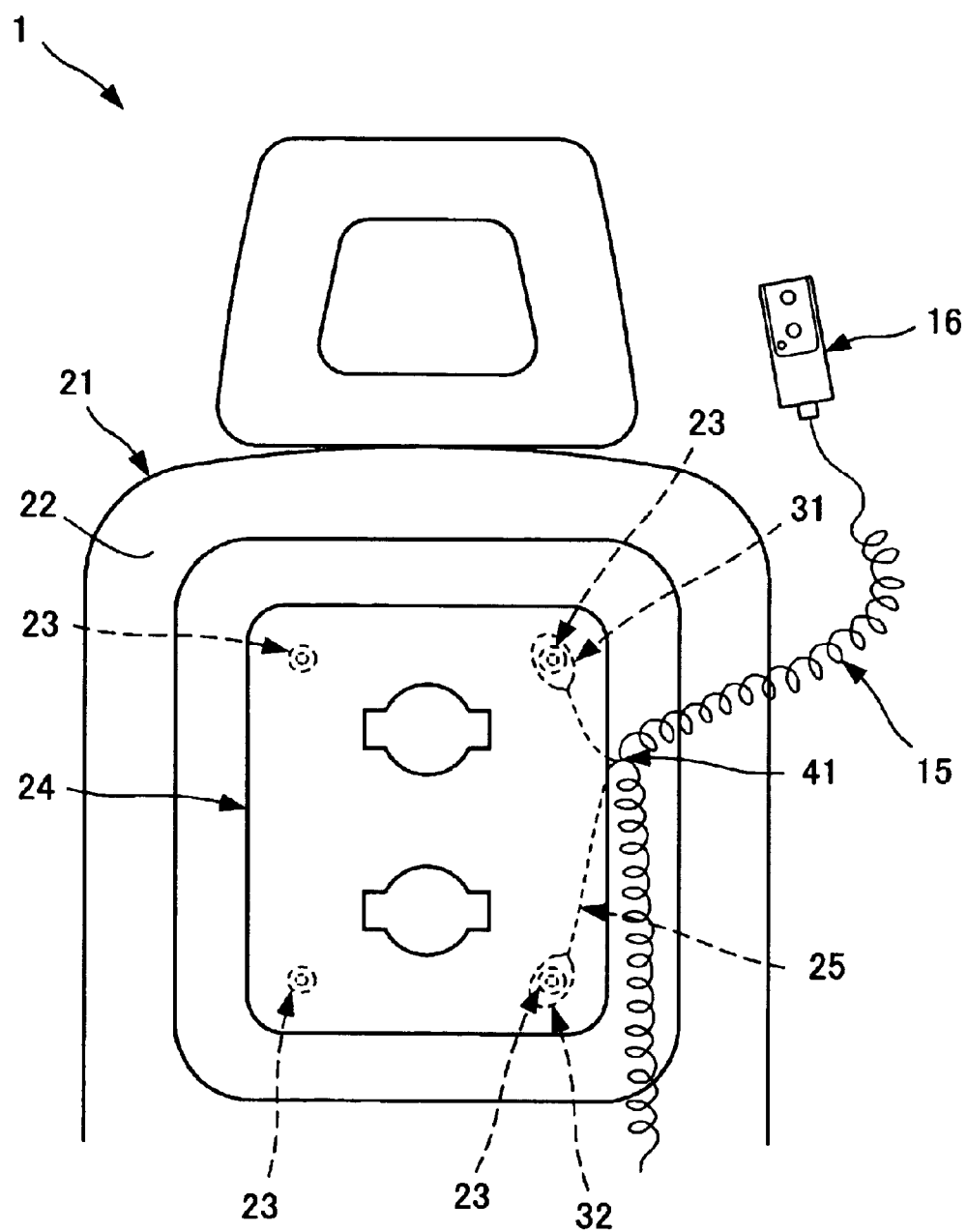
FIG. 2 is a back view showing an essential portion of the embodiment shown in FIG. 1.

On a back surface 22 of a seat back 21 forming a backrest of the seat 1, a backboard 24 is detachably fixed with a plurality of clips 23, . . . as shown in FIG. 2. Between the backboard 24 and the seat back 21, a long locking member 25 is disposed.

Figure 3:
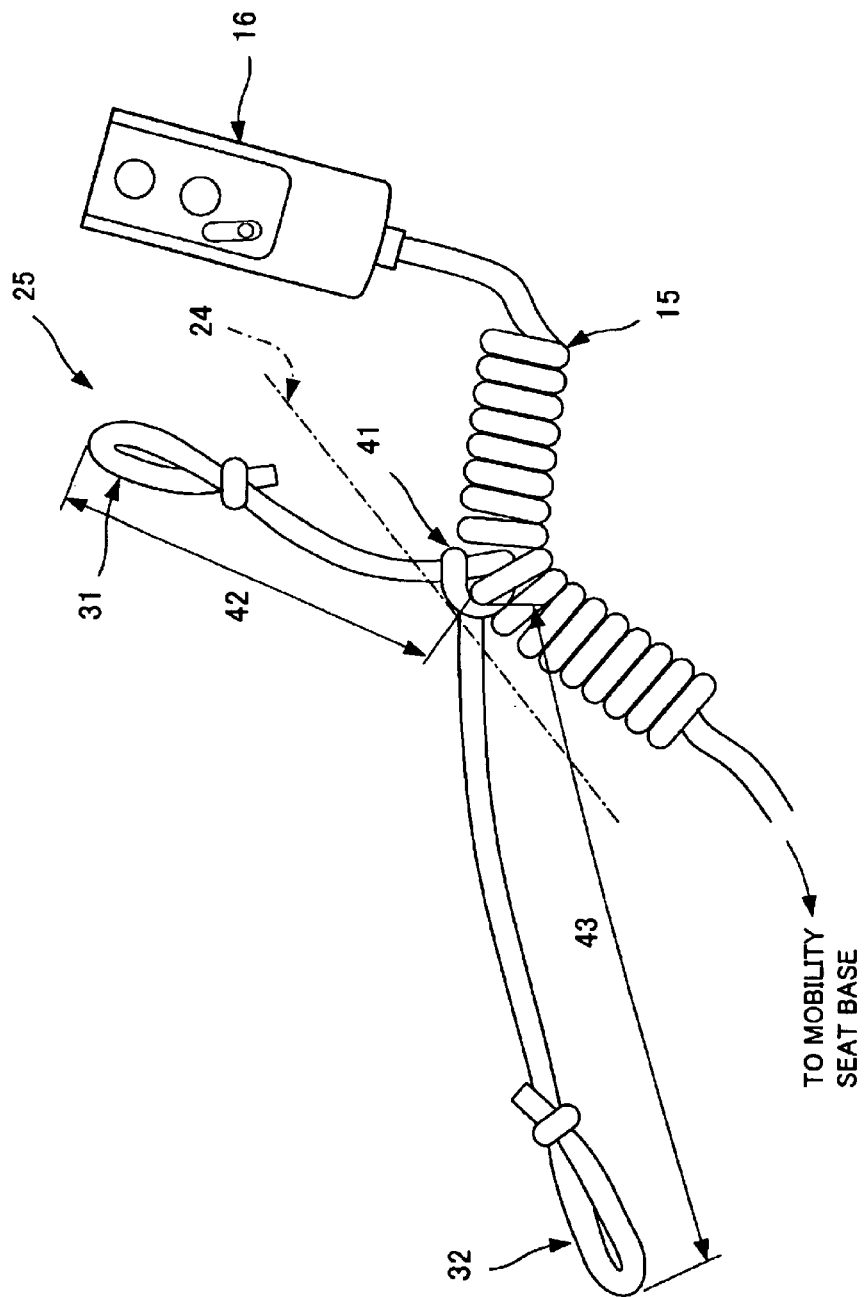
FIG. 3 is an explanatory view showing a locking member of the embodiment shown in FIG. 1.
Figure 4:
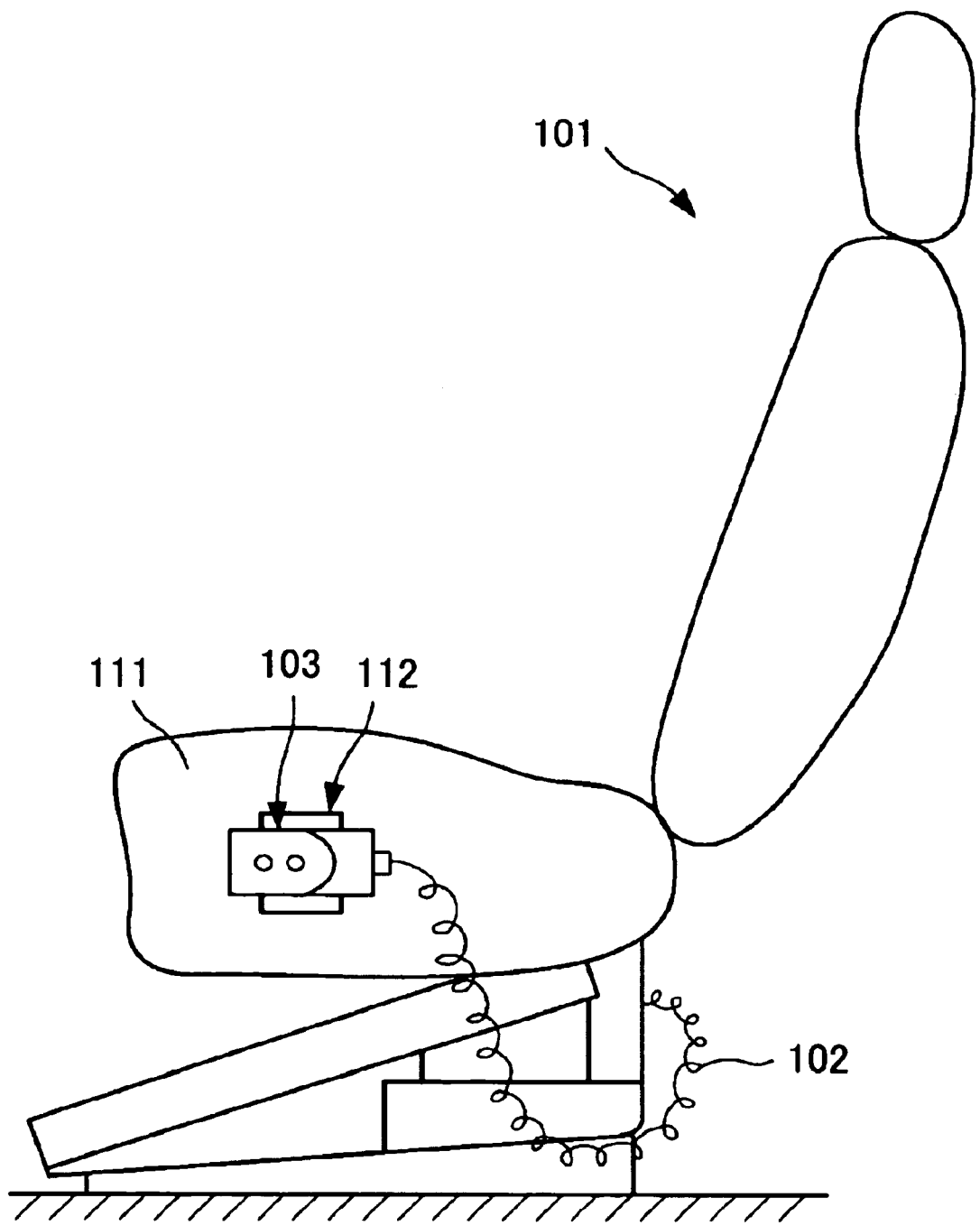
FIG. 4 is a side view showing a conventional cable wiring construction.

As shown in FIG. 3, the locking member 25 is formed into a string shape, and in both end portions thereof, an upper loop portion 31 and a lower loop portion 32, which serve as locked portions, each consisting of an end portion tied in a loop shape are formed. Both the loop portions 31 and 32 are formed so as to have a size capable of inserting the clip 23 therethrough. As shown in FIG. 2, the loop portions 31 and 32 are fixed to the seat back 21 together with the backboard 24 in a state in which the upper and lower clips 23, 23 that fix the backboard 24 to the seat back 21 are inserted therethrough.

As shown in FIG. 3, in an intermediate portion of both the loop portions 31 and 32, a locking portion 41 formed by being tied to the curl cord 15 is provided so that a length 43 from the locking portion 41 to the lower loop portion 32 locked to the lower clip 23 is longer than a length 42 from the locking portion 41 to the upper loop portion 31 locked to the upper clip 23. Thereby, as shown in FIG. 2, the locking portion 41 is located at an upper position of the seat back 21 in a state in which the upper and lower loop portions 31 and 32 are locked to the upper and lower clips 23, 23.

The locking portion 41 is positioned in a state in which proximal end portions thereof are held between the seat back 21 and the backboard 24, and in such a state the length of the locking member 25 is set so that the locking portion 41 exits in an elongated form on the outer periphery of the backboard 24. Thereby, the locking portion 41 for locking an intermediate portion of the curl cord 15 is provided on the back surface 22 of the seat back 21 as shown in FIG. 2, and the height position of the curl cord 15 at a position of being locked in the locking portion 41 is set so as to be higher than a seat cushion 51 of the seat 1 as shown in FIG. 1.

At the side of the seat cushion 51 of the seat 1, a holder 52 for detachably holding the controller 16 is provided. Between the controller 16 held by the holder 52 and the locking portion 41, a droop prevention region 61 is provided to prevent the curl cord 15 from drooping downward from the seat cushion 51. Also, between the locking portion 41 and the unit body 11, an expansion contraction region 62 that is provided with an allowance for allowing the curl cord 15 to expand and contract at the seat sliding is provided.

In this embodiment configured as described above, the intermediate portion of the curl cord 15 extending from the unit body 11 to the controller 16 is locked to the locking portion 41 provided on the seat back 21, and the height position of the curl cord 15 in the locking portion 41 is set so as to be higher than the seat cushion 51.

Therefore, the height position of the curl cord 15 positioned between the controller 16 operated by the seater on the seat cushion 51 and the locking portion 41 can be kept higher than the seat cushion 51. Thereby, the curl cord 15 can be prevented from drooping downward from the seat 1.

Accordingly, the embodiment can prevent a trouble such as breaking of the curl cord 15 caused by pinching, as compared with the conventional cable wiring construction in which the curl cord 15 may droop downward from the seat 1 and may be caught by the rotation mechanism 13 or the sliding mechanism 14 of the unit body 11 provided under the seat 1. This prevents a trouble such that the controller 16 cannot be operated from happening.

Since the allowance of the curl cord 15 is provided in an expansion contraction region 62 between the locking portion 41 and the unit body 11, a load such as tension applied to the curl cord 15 according to the operation of the seat 1 can be prevented.

Also, the locking member 25 provided between the seat back 21 and the backboard 24 of the seat 1 can be positioned and fixed at three positions of clips 23, 23 at different locations and a held portion between the seat back 21 and the backboard 24.

Thereby, the locking portion 41 for the curl cord 15 can be provided without performing post-working such as forming a locking hole for locking the curl cord 15 in the seat back 21, or fixing a bracket therein, so that the original state can be restored.

In this embodiment, the locking portion 41 that is formed by tying the intermediate portion of the locking member 25 to the curl cord 15 has been explained as an example. However, the present invention is not limited to this configuration. For example, the locking portion 41 maybe formed by extending a part of folded portion of the locking member 25 from the backboard 24, or the locking portion 41 may be formed by providing a clip engaging detachably with the curl cord 15 in an intermediate portion of the locking member 25.

As described above, in the cable wiring construction in accordance with the present invention by locking the intermediate portion of the cable extending from the unit body to the controller to the locking portion provided on the seat back, the height position of the cable located between the controller operated by the seater on the seat cushion and the locking portion can be kept higher than the seat cushion. Thereby, the cable can be prevented from drooping downward from the seat.

The embodiment can therefore prevent a trouble such as breaking of a cable caused by pinching, as compared with the conventional cable wiring construction in which the cable may droop downward from the seat and may be caught by the sliding mechanism, the rotation mechanism or the like under the seat.

By providing the allowance of the cable between the locking portion and the unit body, a load such as tension applied to the cable according to the operation of the seat can be prevented.

Also, in the cable wiring construction in accordance with the present invention, the locking, member provided between the seat back and the backboard can be positioned and fixed at three positions of clips at different locations and a held portion between the seat back and the backboard.

Thereby, the locking portion for the cable can be provided without performing post-working such as forming a locking hole in the seat back or fixing a bracket therein, so that the original state can be restored.

What is claimed is:

1. A cable wiring construction for a cable provided between a controller operated by a seater on a seat and a unit body comprising said string form locking member includes:
   a locking portion for locking an intermediate portion of said cable is provided on a seat back of said seat;
   a height position of said cable in said locking portion being set so as to be higher than a seat cushion of said seat;
   a string-form locking member being provided between said seat back and a backboard fixed to said seat back with a plurality of clips;
   said locking member is provided with at least a pair of locked portions that are locked by clips at different place; and
   and said locking portion being held by said back and said backboard, said locking portion being located on an outer periphery of said backboard between both of said locked portions.

2. The cable wire construction of claim 1 wherein said cable has first and second ends, said first end being connected to a controller and said second end being connected to a mechanism for controlling the position of said seat, and said cable being disposed exterior to said seat.

3. A wiring arrangement comprising:
   a seat, said seat having a seat back and a cushion;
   a hand held controller;
   a seat positioning mechanism located below the seat;
   a first elongated member connecting the hand held controller to the seat positioning mechanism, said first elongated mechanism having an intermediate portion;
   a second elongated member having first and second ends respectively fixed to first and second locations on said seat back, said second elongated member being exterior to said seat back and having an intermediate portion connected to said intermediate portion of said first elongated member;
   said intermediate portion or said second elongated member being located on an outer periphery of said seat back so that said intermediate portion of said first elongated mechanism is higher than said seat cushion; and
   said second elongated member being a cable.

4. The wiring arrangement of claim 3 wherein said intermediate portion of said cable is a loop or knot.

* * * * *